United States Patent [19]

Hong

[11] Patent Number: 5,018,282
[45] Date of Patent: May 28, 1991

[54] MECHANICAL SHOVEL

[76] Inventor: Kwang Y. Hong, 87 Wayne Avenue, Scarborough, Ontario, Canada, M1R 1Y4

[21] Appl. No.: 592,004

[22] Filed: Oct. 1, 1990

[51] Int. Cl.⁵ .............................................. E01H 5/02
[52] U.S. Cl. ........................................ 37/130; 37/265
[58] Field of Search ................ 37/129, 130, 131, 133, 37/134, 138, 265, 278; 294/54.5

[56] References Cited

U.S. PATENT DOCUMENTS

| | | | |
|---|---|---|---|
| 887,874 | 5/1908 | Toy | 37/130 |
| 1,489,114 | 4/1924 | Butler | 37/131 |
| 2,720,043 | 10/1955 | Chamberlain | 294/54.5 X |
| 2,930,152 | 3/1960 | Pipkin | 37/130 |
| 3,028,695 | 4/1962 | Westby | 37/130 |
| 3,082,554 | 3/1963 | Steeb | 241/46 B |
| 3,310,891 | 3/1967 | Sachaczenski | 294/54.5 |
| 3,343,807 | 9/1967 | Moraski | 254/131.5 |
| 3,475,838 | 11/1969 | Hagen | 37/265 |
| 3,748,761 | 7/1973 | Chetwynde | 37/130 |
| 4,302,894 | 12/1981 | Emma | 37/130 |

FOREIGN PATENT DOCUMENTS 1311976 1/1962 France .

Primary Examiner—Dennis L. Taylor
Assistant Examiner—Arlen L. Olsen
Attorney, Agent, or Firm—Kenneth M. Garrett

[57] ABSTRACT

A manually powered shovel useful for snow removal consists of a scoop supported from a frame and pivotally connected thereto adjacent its forward edge. A foot operated lever acts to rotate the scoop to eject the load. The pivotal connection preferably permits the forward edge of the scoop to rise vertically under the influence of the lever before it rotates, thereby moving the load towards the back of the scoop.

17 Claims, 4 Drawing Sheets

MECHANICAL SHOVEL

FIELD OF THE INVENTION

This invention relates to a mechanical apparatus. It is particularly described in relation to such apparatus useful for clearing snow, but it is not restricted thereto.

BACKGROUND OF THE INVENTION

In U.S. Pat. No. 3,310,891 to Sachczenski there is described a manually powered snow removal apparatus having a frame and a blade on which snow is collected. The blade is pivotally mounted on one lateral side thereof from the frame. A spring loaded finger locates beneath the blade and upon actuation of a release, the finger upwardly and thereby rotates the blade, throwing the snow to one side thereof. While provision is made to vary the degree of compression of the spring and hence the force applied to throw the snow to one side, such force is limited by the maximum degree of compression of the spring, which may be inadequate to lift snow loaded onto the blade. Moreover, the apparatus includes a treadle for compressing the spring; as the spring pressure is released, the treadle will be urged upwardly with a speed depending on the load on the blade. Since the treadle is relatively exposed to permit its use, it may result in inadvertent injury to the operator its release.

SUMMARY OF THE INVENTION

In accordance with broad aspects of my invention, a manually powered mechanical shovel comprises a frame including a chassis and a handle means extending rearwardly from the chassis in a longitudinal axial direction. The shovel further comprises means, for example wheels for supporting the chassis from a ground surface for movement thereover, and a scoop for collecting material therein. The scoop has a forward portion and a rearward portion, and the forward portion is mounted to the frame by means permitting rotation movement of the scoop about an axis. A lever means is provided for rotating the scoop for emptying. The lever has a first end and a second end interconnected by a mid portion and a fulcrum mounting the mid portion to the frame for rotation. The first end is operatively connected to the scoop whereby a downward movement on the second end, typically under the influence of a foot action, causes the scoop to rotate about the axis to empty any load contained therein.

The term "operatively connected" does not necessarily entail any physical joining of the scoop and the lever together, although this is not precluded. In accordance with a preferred embodiment of the invention to be described in greater detail, the first end of the lever comprises a pair of forks which respectively locate along each lateral side of the scoop, and a rod passing beneath the scoop transmits upward movement of the first end of the lever to the scoop. Preferably the means mounting the scoop for rotation also permits the forward end of the scoop to rise vertically. Desirably the lever first end is operatively connected to the scoop forwardly of the center of gravity of the scoop.

Accordingly, the initial upward movement of the first end of the lever will be translated into upward movement of the first end of the scoop accompanied by a small degree of rotation about the axis of rotation of the scoop, such that the scoop will tilt rearwardly. This action tends to transfer any load position at the forward end of the scoop towards the rear. When the front end of the scoop reaches the upper limit of travel, further upward movement of the first end of the lever will be translated exclusively into a forward rotational movement of the scoop about its axis of rotation, thereby causing the load in the scoop to be ejected, and a vigorous lever action will cause the load to be flung from the scoop.

While the lifting of the front end of the scoop is advantageous in transferring the load to the rear of the scoop, it will also be advantageous where the front end of the scoop functions as a ground contacting blade. However, in accordance with the preferred embodiment, a ground contacting blade is provided separately from the scoop, and the blade is rigidly mounted from the frame forwardly of the scoop.

The foregoing aspects of my invention together with still further aspects thereof, will be described in greater detail in the preferred embodiment of my invention, taken in conjunction with the drawings annexed hereto.

BRIEF DESCRIPTION OF THE PREFERRED EMBODIMENT

Figure 1:
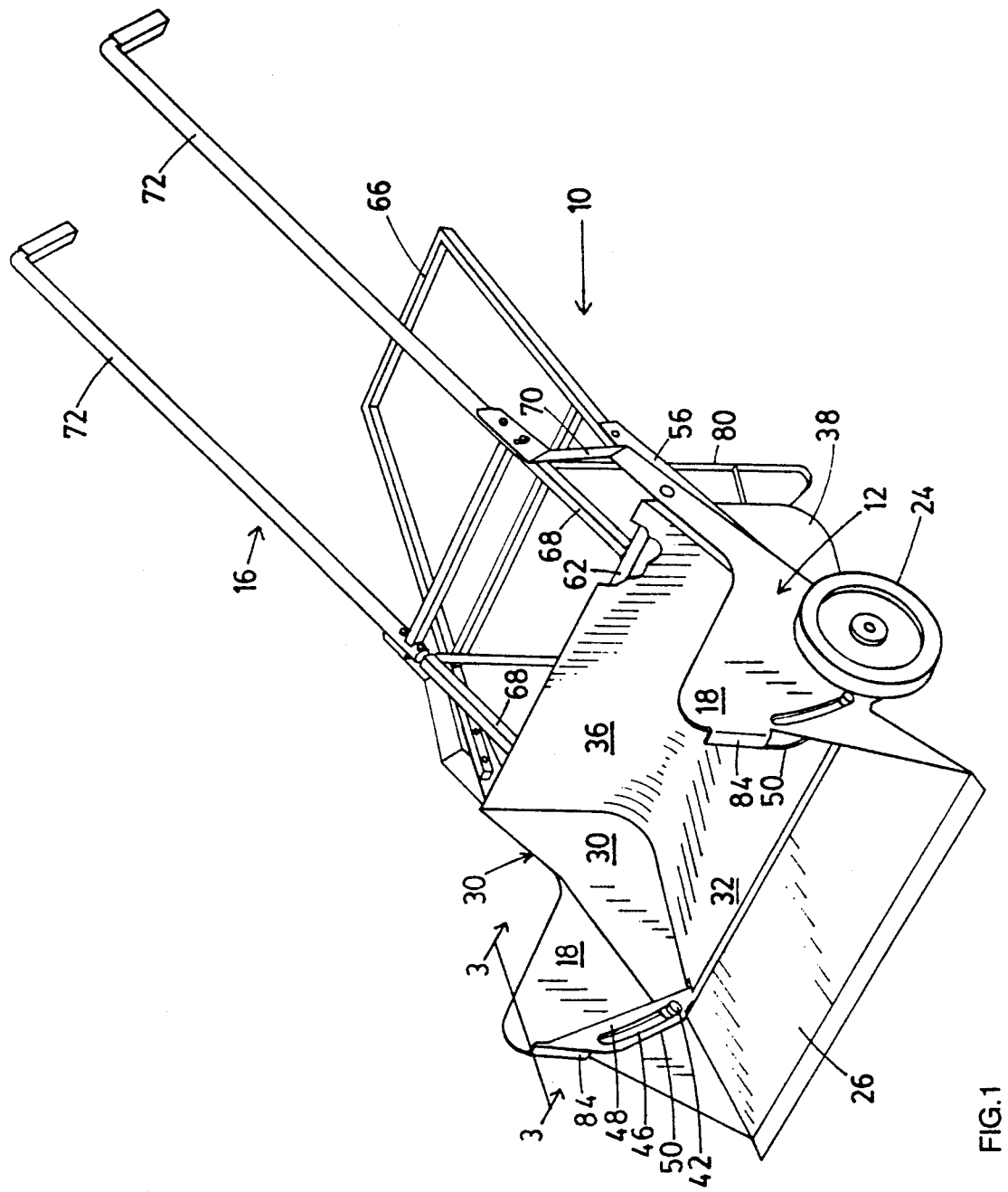
FIG. 1 is a frontal, perspective left hand side view of a mechanical shovel in accordance with my invention, partially broken away to reveal detail.

Considering the drawings in detail a mechanical shovel constructed in accordance with my invention is identified therein by the numeral 10.

Shovel 10 comprises a frame 12 including first and second portions namely a chassis 14 and handles 16 extending rearwardly of the chassis to define an axial direction. Chassis 14 comprises a pair of similar transversely spaced apart, generally parallel cheeks 18 defining the left and right flanks of shovel 10. Cheeks 18 are maintained in their spaced apart relationship in part by an axle 22 extending therebetween, upon which is mounted left and right wheels 24 for moving shovel 10 over a ground surface.

Cheeks 18 are also maintained in their spaced apart relationship by a blade 26 which is rigidly secured thereto and projects downwardly forwardly thereof at a small angle.

A scoop 30 nests between cheeks 18. Scoop 30 comprises a floor 32 having a leading edge 34, a back wall 36 and side walls 38 interconnecting floor 32 and back wall 36.

Scoop 30 is supported from chassis portion 14 by a pair of gudgeon pins 42 respectively secured to side walls 38 adjacent the leading edge 34 of the scoop, the gudgeon pins extending both outwardly and inwardly from each transverse face of an associated side wall. Each check 18 is provided with an accurately upstanding slot 44 within which he outwardly extending portion of an associated gudgeon pin 42 is slidingly received. The inwardly facing ends of gudgeon pins 42 are respectively slidingly received in slots 46 similar to slots 44 formed in the bight 48 of U shaped brackets 50 welded to cheeks 18. Slots 44, 46 together form a gudgeon slot in which pins 42 are slidingly captured, and together therewith the forward portion of scoop 30.

Figure 2:
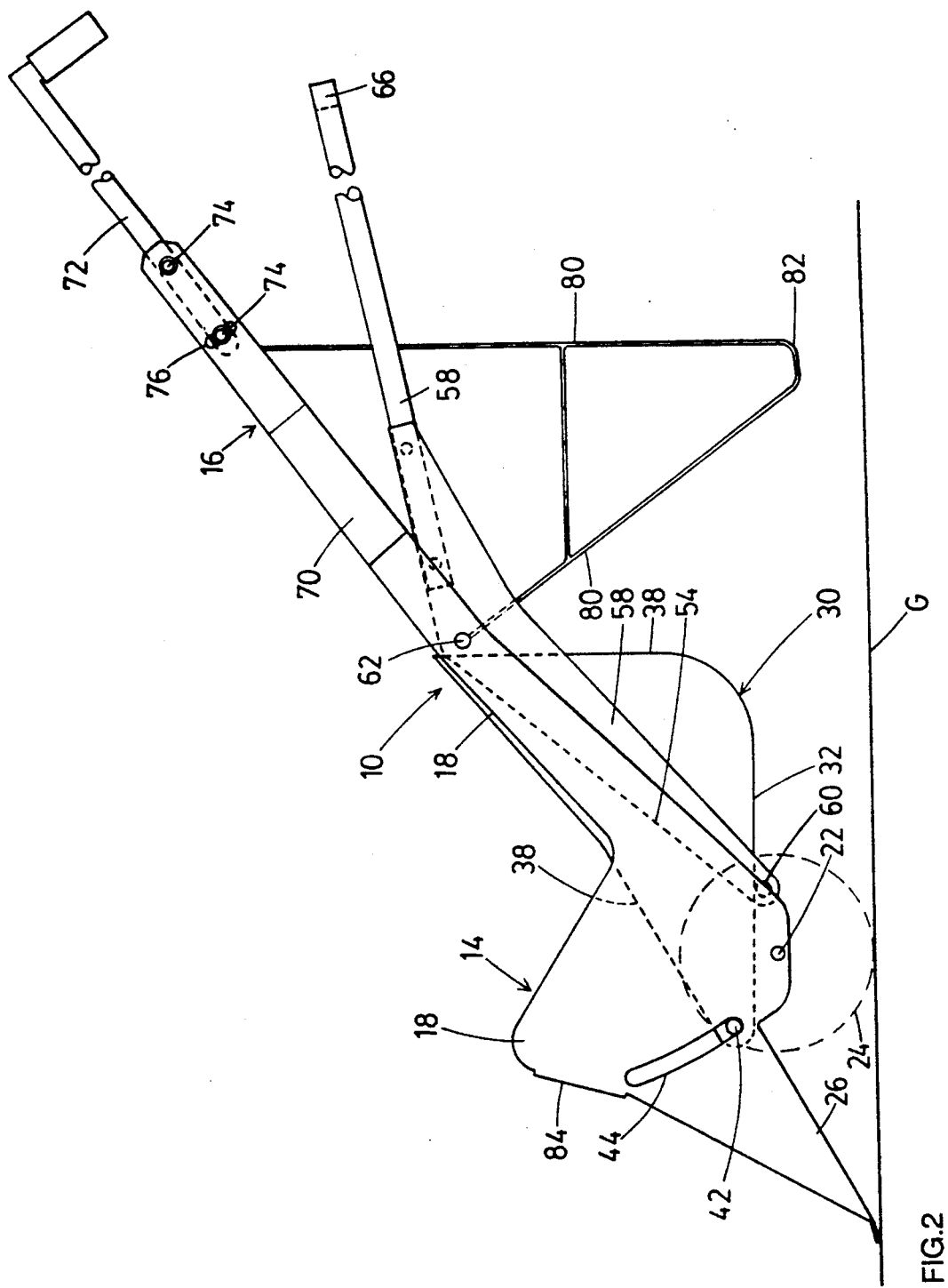
FIG. 2 is a left hand side elevation of the shovel of FIG. 1, with the wheel and hidden parts shown in dotted outline.
Figure 3:
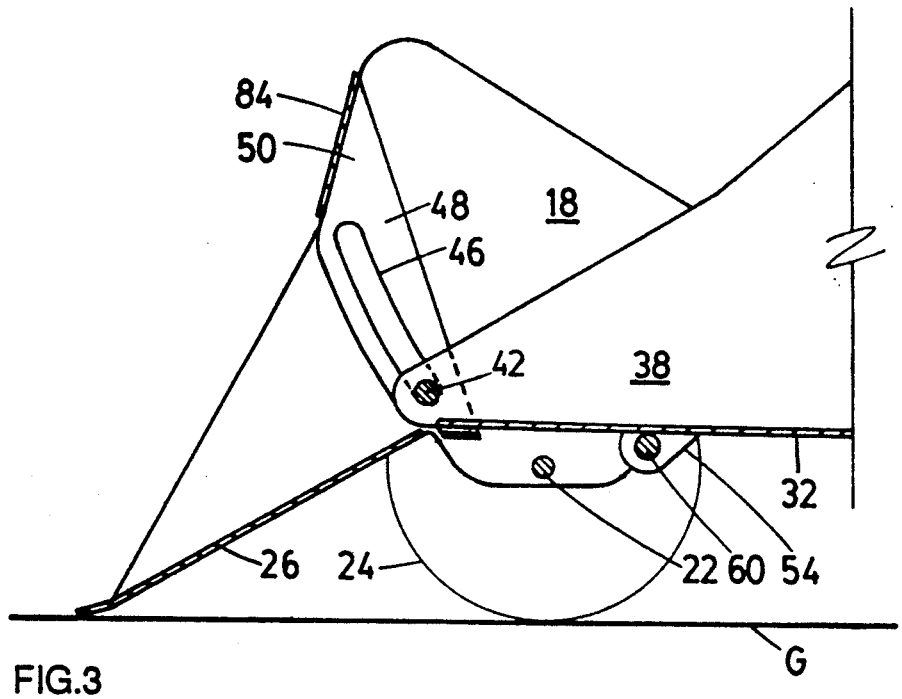
FIG. 3 is a sectional elevation of a forward portion of the shovel in the longitudinal plane 3—3 of FIG. 1, in mirror image.

The lateral width of scoop 30 is somewhat less than the internal separation between opposed checks 18, so as to leave a small space between each cheek 18 and the adjacent side wall 38. Within this space there extends a fork 54 forming part of a lever arm 58. The lower extremities of forks 54 terminate beneath the floor 32 of scoop 30 and are connected together by a tie rod 60, which serves to support scoop 30. When thee scoop 30 is in its fully lowered position, as seen in FIGS. 1, 2 and 3, the tie rod 60 locates axially somewhat forwardly of the transverse axis of balance of the scoop.

Opposed cheeks 18 are rigidly interconnected rearwardly of scoop 30 by a horizontal, transverse tube 62 which passes through forks 54 and serves as a fulcrum for lever arm 58. The back wall 36 of scoop 30 conveniently abuts tube 62, which thereby serves to locate and support the scoop when in its lowered position. Lever arm 58 extends rearwardly of fulcrum tube 62 as a continuation of forks 54, and the upper ends of the fork are interconnected by a bight 66 which passes beneath handle 16.

Handles 16 comprise a forward portion 68, the forward ends of which are rigidly connected to tube 62, and the rearward ends of which are rigidly connected to cheeks 18 by brackets 70. Handles 16 further comprise a rearward portion 72 mounted from brackets 70 by bolts 74, each bracket having a slot 76 to permit the angle of handles 16 to be adjusted.

A pair of laterally spaced apart, V shaped legs 80 having feed 82 are rigidly secured to frame 12, the upper end of each leg conveniently connecting respectively to tube 62 and adjacent the juncture of forward handle portion 68 with bracket 70. Legs 80 have a vertical height such that feet 82 are raised above the ground surface G by several centimetres when the blade 26 contacts the ground, as best seen in FIG. 2.

Figure 4:
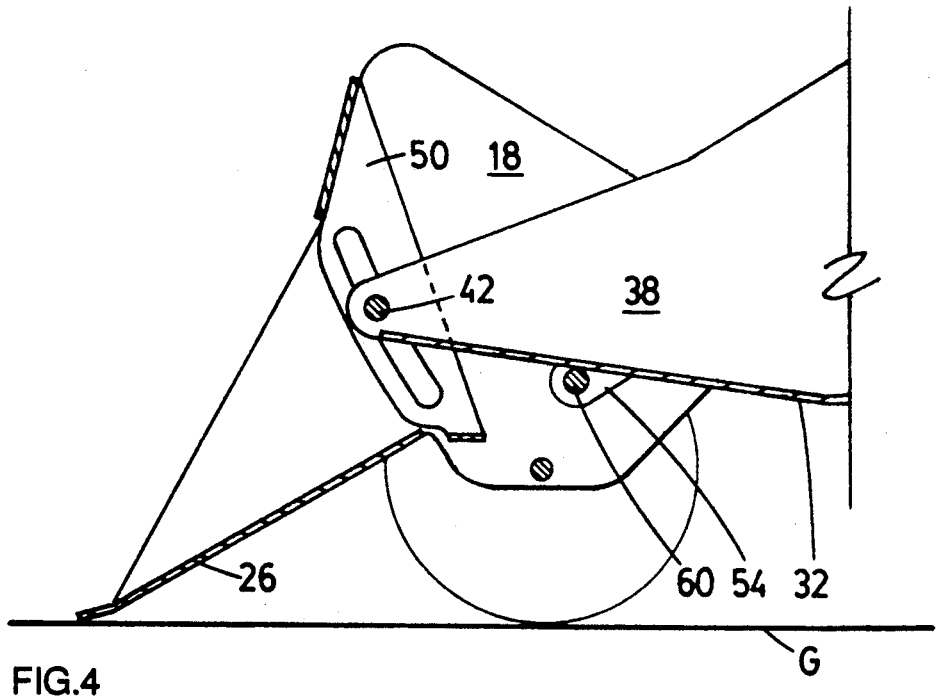
FIG. 4 is similar to FIG. 3, but shows the shovel partially actuated.
Figure 5:
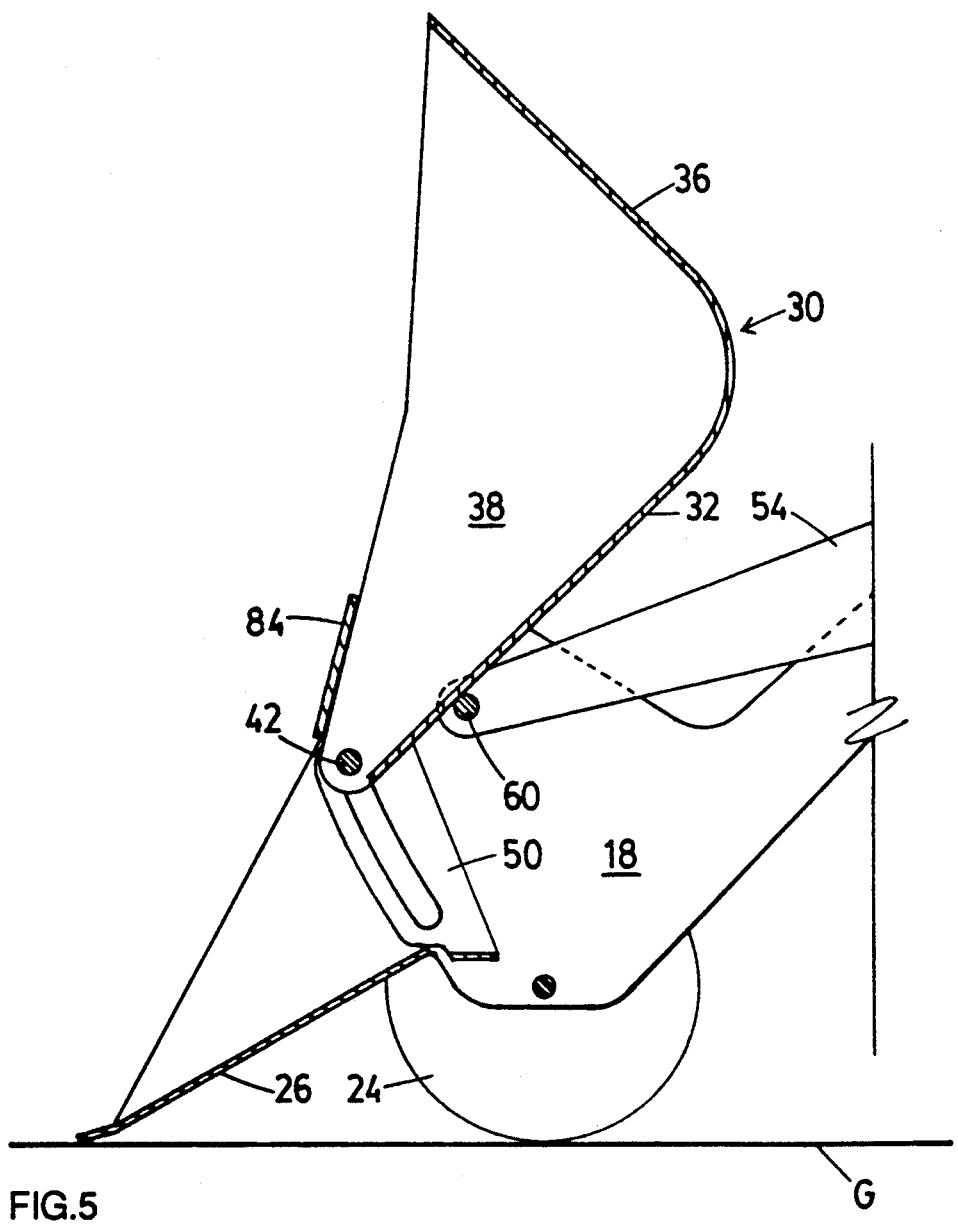
FIG. 5 is similar to FIG. 3, but shows the shovel fully actuated.

In operation, the shovel 10 is pushed forwardly onto material to be transferred, typically snow, thereby forcing the material upwardly on blade 26 to load scoop 30. Periodically scoop 30 may be canted rearwardly, as seen in FIG. 4, by applying foot pressure to the bight 66 of lever arm 58, thereby causing gudgeon pins 42 to ride upwardly in gudgeon slots formed by slots 44, 46, thereby transferring the load to the rear scoop 30. When it is desired to empty scoop 30, increased pressure is applied to bight 66, so as to urge gudgeon pins 42 to the top of slots 44, 46. Still further upward movement of scoop 30 about gudgeon pins 42, until ultimately, an upper edge of each side wall 38 moves into abutment with a stop 84 formed by an arm of bracket 50.

When lever arm 58 is actuated slowly, the load contained within scoop 30 will slide downwardly from the scoop to the ground. Any load which tends to stick to scoop 30 may normally be released by slamming the scoop into abutment with stops 84. Where lever arm 58 is actuated vigorously, the rapid rotational movement of scoop 30 will fling the load from the scoop. Release of foot pressure from the bight 66 of lever arm 58 will cause the forward end 54 of the lever arm to descent either under its own weight or under the weight of scoop 30. Should it be desired a spring or other means may be employed to bias scoop 30 to its lowest-position, but this will not normally be required.

It will be apparent that many changes may be made to the illustrative embodiment, while falling within the scope of the invention and it is intended that all such changes be covered by the claims appended hereto.

I claim:

1. A manually powered mechanical shovel comprising a frame including a chassis and a handle means extending rearwardly from said chassis to define a longitudinal axial direction;
   means for supporting said chassis from a ground surface for movement thereover;
   a scoop for collecting material therein, said scoop having a forward portion and a rearward portion;
   means mounting said forward portion of said scoop to said frame for rotation about an axis;
   means for emptying material from said scoop comprising a lever means having a first end and a second end interconnected by a mid portion; and
   fulcrum means mounting said mid portion to said frame for rotation thereabout;
   said first end of said lever being operatively connected to said scoop whereby a downward movement of said second end of said lever causes said scoop to rotate about said axis to empty any load contained therein.

2. A manually powered mechanical shovel as defined in claim 1, wherein said axis is transverse to the longitudinal axial direction.

3. A manually powered mechanical shovel as defined in claim 1, wherein said means supporting said chassis comprises a pair of wheels.

4. A manually powered mechanical shovel as defined in claim 1, including a blade for urging material into said scoop as said shovel is moved forwardly.

5. A manually powered mechanical shovel as defined in claim 4, wherein said blade is rigidly secured to said frame.

6. A manually powered mechanical shovel as defined in claim 1, wherein said means mounting said scoop includes an upwardly elongated gudgeon slot formed in one of said chassis and said scoop, and a gudgeon pin secured to the other of said chassis and said scoop, said gudgeon pin being slidable along said slot.

7. A manually powered mechanical shovel as defined in claim 6, wherein said gudgeon slot is formed in said chassis.

8. A manually powered mechanical shovel as defined in claim 7, wherein said chassis includes a pair of laterally spaced apart cheeks.

9. A manually powered mechanical shovel as defined in claim 8, wherein said chassis further includes a bracket secured to each said cheek inwardly thereof, and wherein said gudgeon slot is formed in said bracket and said cheeks.

10. A manually powered mechanical shovel as defined in claim 9, wherein each said gudgeon pin is captured between a said cheek and a said bracket.

11. A manually powered mechanical shovel as defined in claim 1, wherein said first end of said lever comprises a pair of forks, the lower end of each said fork being interconnected by a rod passing beneath said scoop, said rod serving to transmit an upward movement of said first end of said lever to said scoop.

12. A manually powered mechanical shovel as defined in claim 11, wherein said rod locates axially forwardly of the transverse axis of balance of said scoop.

13. A manually powered mechanical shovel as defined in claim 11, wherein the second end of said lever comprises a pair of forks, and a bight interconnecting the rearward ends thereof.

14. A manually powered mechanical shovel as defined in claim 1, wherein said fulcrum means comprises an axle interconnecting transversely spaced apart portions of said frame, and said lever is mounted on said axle.

15. A manually powered mechanical shovel as defined in claim 14, wherein said axle is in the form of a tube rigidly connected to said frame portions.

16. A manually powered mechanical shovel as defined in claim 1, further comprising leg means downwardly depending from said frame, said leg means having foot means located axially rearwardly of said fulcrum means.

17. A manually powered mechanical shovel as defined in claim 1, wherein said handle means includes means for adjusting the angle thereof.

* * * * *